United States Patent
Naoi et al.

(10) Patent No.: US 11,705,156 B2
(45) Date of Patent: *Jul. 18, 2023

(54) HEXAGONAL STRONTIUM FERRITE POWDER, MAGNETIC RECORDING MEDIUM, AND MAGNETIC RECORDING AND REPRODUCING APPARATUS

(71) Applicant: FUJIFILM Corporation, Tokyo (JP)

(72) Inventors: Kenji Naoi, Minami-ashigara (JP); Masashi Shirata, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,561

(22) Filed: Dec. 6, 2021

(65) Prior Publication Data

US 2022/0093126 A1 Mar. 24, 2022

Related U.S. Application Data

(62) Division of application No. 16/737,521, filed on Jan. 8, 2020, now Pat. No. 11,222,661.

(30) Foreign Application Priority Data

Jan. 11, 2019 (JP) ................................ 2019-003419

(51) Int. Cl.
| | | |
|---|---|---|
| G11B 5/706 | (2006.01) |
| G11B 5/70 | (2006.01) |
| G11B 5/712 | (2006.01) |
| C01G 49/00 | (2006.01) |
| G11B 5/702 | (2006.01) |
| G11B 5/78 | (2006.01) |

(52) U.S. Cl.
CPC ........ *G11B 5/70678* (2013.01); *C01G 49/009* (2013.01); *C01G 49/0018* (2013.01); *C01G 49/0054* (2013.01); *G11B 5/7013* (2013.01); *G11B 5/70615* (2013.01); *G11B 5/712* (2013.01); *C01P 2006/42* (2013.01); *G11B 5/7022* (2013.01); *G11B 5/78* (2013.01)

(58) Field of Classification Search
None
See application file for complete search history.

(56) References Cited

U.S. PATENT DOCUMENTS

| | | | |
|---|---|---|---|
| 4,562,105 A | 12/1985 | Machida et al. |
| 4,606,971 A | 8/1986 | Ido et al. |
| 4,764,300 A | 8/1988 | Hibst et al. |
| 5,055,322 A | 10/1991 | Yamamoto |
| 10,748,570 B2 * | 8/2020 | Terakawa ................. G11B 5/65 |
| 11,222,661 B2 * | 1/2022 | Naoi ..................... C01G 49/009 |
| 2007/0099033 A1 * | 5/2007 | Minachi .............. C04B 35/2633 |
| | | | 252/62.62 |
| 2010/0238063 A1 | 9/2010 | Ohkoshi et al. |
| 2011/0175014 A1 * | 7/2011 | Hattori ................... B82Y 30/00 |
| | | | 252/62.56 |
| 2012/0183811 A1 * | 7/2012 | Hattori ................. G11B 5/7085 |
| | | | 428/836 |
| 2015/0187380 A1 | 7/2015 | Shitara |
| 2016/0203894 A1 | 7/2016 | Shirata et al. |
| 2016/0217817 A1 * | 7/2016 | Masada ..................... H01F 1/11 |
| 2018/0366152 A1 | 12/2018 | Naoi et al. |
| 2020/0227083 A1 | 7/2020 | Naoi et al. |

FOREIGN PATENT DOCUMENTS

| | | | |
|---|---|---|---|
| JP | 60164302 A | | 8/1985 |
| JP | 03147520 A | | 6/1991 |
| JP | 04059620 A | * | 2/1992 |
| JP | 04-072601 A | | 3/1992 |
| JP | 05-314467 A | | 11/1993 |
| JP | 05314467 A | * | 11/1993 |
| JP | 05319831 A | * | 12/1993 |
| JP | 07-93742 A | | 4/1995 |
| JP | 09129428 A | * | 5/1997 |
| JP | 2007-126306 A | | 5/2007 |
| JP | 2015-127985 A | | 7/2015 |
| JP | 2016139451 A | * | 8/2016 ......... G11B 5/70678 |
| JP | 2019-003715 A | | 1/2019 |

OTHER PUBLICATIONS

English language Abstract of JP 09-129428 A (Year: 1997).*
English language Abstract of JP 05-319831 A (Year: 1993).*
English language Abstract of JP 04-059620 A (Year: 1992).*
English language Abstract of JP 2016-139451 A (Year: 2016).*
Office Action dated Nov. 9, 2021 from the Japanese Patent Office in JP Application No. 2019-003419.
Machine translation of JPH 05-314467 A (Year: 1993).
JPO Abstract Translation of JP-60164302-A (Year: 1985).
Derwent Abstract Translation of JP-03147520-A (Year: 1991).

* cited by examiner

*Primary Examiner* — Kevin M Bernatz
(74) *Attorney, Agent, or Firm* — Sughrue Mion, PLLC

(57) ABSTRACT

A hexagonal strontium ferrite powder, in which an average particle size is 10.0 to 25.0 nm, a content of one or more kinds of atom selected from the group consisting of a gallium atom, a scandium atom, an indium atom, and an antimony atom is 1.0 to 15.0 atom % with respect to 100.0 atom % of an iron atom, and a coercivity Hc is greater than 2,000 Oe and smaller than 4.000 Oe. A magnetic recording medium including: a non-magnetic support; and a magnetic layer including a ferromagnetic powder and a binding agent on the non-magnetic support, in which the ferromagnetic powder is the hexagonal strontium ferrite powder. A magnetic recording and reproducing apparatus including this magnetic recording medium.

16 Claims, No Drawings

HEXAGONAL STRONTIUM FERRITE POWDER, MAGNETIC RECORDING MEDIUM, AND MAGNETIC RECORDING AND REPRODUCING APPARATUS

CROSS-REFERENCE TO RELATED APPLICATIONS

This application is a divisional of application Ser. No. 16/737,521 filed Jan. 8, 2020, now issued as U.S. Pat. No. 11,222,661 on Jan. 11, 2022, which claims priority under 35 U.S.C 119 to Japanese Patent Application No. 2019-003419 filed on Jan. 11, 2019. Each of the above applications are hereby expressly incorporated by reference, in their entirety, into the present application.

BACKGROUND OF THE INVENTION

1. Field of the Invention

The present invention relates to a hexagonal strontium ferrite powder, a magnetic recording medium, and a magnetic recording and reproducing apparatus.

2. Description of the Related Art

A hexagonal ferrite powder is widely used as a ferromagnetic powder in a magnetic recording field and the like. In recent years, various proposals regarding the hexagonal ferrite powder have been made for improving properties thereof (see JP1995-093742A (JP-H07-093742A) and JP2007-126306A).

SUMMARY OF THE INVENTION

A crystal structure of a hexagonal ferrite includes at least an iron atom, a divalent metal atom, and an oxygen atom as constituting atoms. The hexagonal strontium ferrite powder has a crystal structure of a hexagonal ferrite in which a divalent metal atom mainly included is a strontium atom. It is thought that the hexagonal strontium ferrite powder is advantageous for increasing a reproducing output, in a case of reproducing information recorded on a magnetic recording medium, compared to other kinds of the hexagonal ferrite powder.

In recent years, in the magnetic recording field, recording with higher density has proceeded and, along with this, a decrease in particle size of ferromagnetic powder (hereinafter, referred to as "atomization") is required. However, the recording density is increased by the atomization of the ferromagnetic powder, magnetization attenuation occurs due to reduction of a magnetic field. Therefore, in order to improve electromagnetic conversion characteristics, it is desired to prevent the magnetization attenuation by increasing a coercivity Hc of the ferromagnetic powder.

In consideration of these circumstances, the inventors have researched the atomization and an increase in coercivity of the hexagonal strontium ferrite powder. However, as a result of the research, it was clear that only the atomization and increase in coercivity are not enough for improving the electromagnetic conversion characteristics.

One aspect of the invention provides for a hexagonal strontium ferrite powder capable of being used for manufacturing a magnetic recording medium having excellent electromagnetic conversion characteristics.

According to one aspect of the invention, there is provided a hexagonal strontium ferrite powder, in which an average particle size is 10.0 to 25.0 nm, a content of one or more kinds of atom selected from the group consisting of a gallium atom, a scandium atom, an indium atom, and an antimony atom is 1.0 to 15.0 atom % with respect to 100.0 atom % of an iron atom, and a coercivity Hc is greater than 2,000 Oe and smaller than 4,000 Oe.

In regard to the unit Oe (oersted), 1 Oe=79.6 A (amperes). 2,000 Oe=159 kA/m, and 4,000 Oe=318 kA/m.

In an embodiment, the hexagonal strontium ferrite powder may be a ferromagnetic powder for magnetic recording.

In an embodiment, a mass magnetization σs of the hexagonal strontium ferrite powder may be equal to or greater than 41 A·m²/kg.

In an embodiment, the content of the one or more kinds of atom selected from the group consisting of a gallium atom, a scandium atom, an indium atom, and an antimony atom in the hexagonal strontium ferrite powder may be 1.0 to 12.0 atom % with respect to 100.0 atom % of an iron atom.

In an embodiment, the hexagonal strontium ferrite powder may include a gallium atom.

In an embodiment, the hexagonal strontium ferrite powder may include a scandium atom.

In an embodiment, the hexagonal strontium ferrite powder may include an indium atom.

In an embodiment, the hexagonal strontium ferrite powder may include an antimony atom.

In an embodiment, the hexagonal strontium ferrite powder may further include an aluminum atom.

In an embodiment, the hexagonal strontium ferrite powder may further include a neodymium atom.

In an embodiment, the hexagonal strontium ferrite powder may have a magnetoplumbite type crystal structure.

According to another aspect of the invention, there is provided a magnetic recording medium comprising: a non-magnetic support; and a magnetic layer including a ferromagnetic powder and a binding agent on the non-magnetic support, in which the ferromagnetic powder is the hexagonal strontium ferrite powder.

According to still another aspect of the invention, there is provided a magnetic recording and reproducing apparatus comprising: the magnetic recording medium; and a magnetic head.

According to one aspect of the invention, it is possible to provide a hexagonal strontium ferrite powder usable for manufacturing a magnetic recording medium having excellent electromagnetic conversion characteristics. In addition, according to one aspect of the invention, it is possible to provide a magnetic recording medium including such a hexagonal strontium ferrite powder in a magnetic layer, and a magnetic recording and reproducing apparatus including this magnetic recording medium.

DESCRIPTION OF THE PREFERRED EMBODIMENTS

Hexagonal Strontium Ferrite Powder

In a hexagonal strontium ferrite powder according to one aspect of the invention, an average particle size is 10.0 to 25.0 nm, a content of one or more kinds of atom selected from the group consisting of a gallium atom, a scandium atom, an indium atom, and an antimony atom is 1.0 to 15.0 atom % with respect to 100.0 atom % of an iron atom, and a coercivity Hc is greater than 2,000 Oe and smaller than 4,000 Oe. The hexagonal strontium ferrite powder is suitable as a ferromagnetic powder for magnetic recording and can be used for forming a magnetic layer of a coating type magnetic recording medium, for example.

Hereinafter, the hexagonal strontium ferrite powder will be described more specifically.

Average Particle Size

An average particle size of the hexagonal strontium ferrite powder is 10.0 to 25.0 nm. The average particle size of the hexagonal strontium ferrite powder is equal to or smaller than 25.0 nm, preferably equal to or smaller than 23.0 nm, more preferably equal to or smaller than 21.0 nm, and even more preferably equal to or smaller than 18.0 nm, from a viewpoint of realization of high density recording. The average particle size of the hexagonal strontium ferrite powder is equal to or greater than 10.0 nm, preferably equal to or greater than 12.0 nm, and more preferably equal to or greater than 14.0 nm, from a viewpoint of stability of magnetization.

In the invention and the specification, average particle sizes of various powder are values measured by the following method with a transmission electron microscope.

The powder is imaged at a magnification ratio of 100,000 with a transmission electron microscope, the image is printed on photographic printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate are directly in contact with each other, but also includes an aspect in which a binding agent or an additive which will be described later is interposed between the particles.

As a method of collecting a sample powder from the magnetic recording medium in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

Coercivity Hc

A coercivity Hc of the hexagonal strontium ferrite powder is greater than 2,000 Oe and smaller than 4,000 Oe. The coercivity Hc of the hexagonal strontium ferrite powder is greater than 2,000 Oe, preferably equal to or greater than 2,150 Oe, more preferably equal to or greater than 2,300 Oe, and even more preferably equal to or greater than 2,300 Oe, from a viewpoint of improving electromagnetic conversion characteristics. As the coercivity Hc is high, ease of recording (writing) of the information tends to be deteriorated, and accordingly, the electromagnetic conversion characteristics tend to be deteriorated. From this viewpoint, the coercivity Hc of the hexagonal strontium ferrite powder is smaller than 4,000 Oe, preferably equal to or smaller than 3,800 Oe, and more preferably equal to or smaller than 3,500 Oe. 2,150 Oe=171 kA/m, 2,300 Oe=183 kA/m, 2,500 Oe=199 kA/m, 3,000 Oe=239 kA/m, 3,500 Oe=279 kA/m, 3,800 Oe=303 kA/m.

The coercivity Hc can be measured by a well-known measurement device capable of measuring magnetic properties such as an oscillation sample type magnetic-flux meter. In the invention and the specification, the coercivity Hc is a value measured at a measurement temperature of 25° C.±1° C. The measurement temperature is an atmosphere temperature of the surroundings of the hexagonal strontium ferrite powder during the measurement. The same applies to a mass magnetization σs which will be described later.

Constituting Atom

The hexagonal strontium ferrite powder is one kind of hexagonal ferrite powder and has a crystal structure of hexagonal ferrite. A crystal structure of hexagonal ferrite includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the hexagonal strontium ferrite powder is powder in which main divalent metal atom included in this powder is a strontium atom, and the main divalent metal atom is a divalent metal atom occupying the greatest content in the divalent metal atom included in the powder based on atom %. A content of the strontium atom in the hexagonal strontium ferrite powder can be, for example, 2.0 to 15.0 atom % with respect to 100.0 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, the hexagonal strontium ferrite powder can include a barium atom and/or a calcium atom, instead of the strontium atom. In a case where the barium atom and/or the calcium atom is included as the divalent metal atom other than the strontium atom, a content of a barium atom and a content of a calcium atom in the hexagonal strontium ferrite powder respectively can be, for example, 0.05 to 5.0 atom % with respect to 100.0 atom % of the iron atom. In the invention and the specification, the divalent metal atom considered when defining the hexagonal strontium ferrite powder does not a rare-earth atom. The "rare-earth atom" in the invention and the specification is an atom selected from the group consisting of a scandium atom (Sc), a yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), a europium atom (Eu), a gadolinium atom (Gd), a terbium atom (Tb), a dysprosium atom (Dy), a holmium atom (Ho), an erbium atom (Er), a thulium atom (Tm), a ytterbium atom (Yb), and a lutetium atom (Lu).

As the crystal structure or the hexagonal ferrite, a magnetoplumbite type (also referred to as an "M type"), a W type, a Y type, and a Z type are known. The hexagonal strontium ferrite powder may have any crystal structure of hexagonal ferrite. The crystal structure can be continued by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, and one or more kinds of atom selected from the group consisting of a gallium atom (Ga), a scandium atom (Sc), an indium atom (In), and an antimony atom (Sb), and may or may not include atoms other than these atoms. Hereinafter, one or more kinds of atom selected from the group consisting of a gallium atom (Ga), a scandium atom (Sc), an indium atom (In) and an antimony atom (Sb) are "M atoms". The various M atoms are metal atoms (trivalent metal atoms) which may become trivalent cations and are not classified to divalent metal atoms considered when defining the hexagonal strontium ferrite powder. The hexagonal strontium ferrite powder may include, as the M atom, only one kind of atom selected from the group consisting of a gallium atom, a scandium atom, an indium atom, and an antimony atom, may include two kinds thereof in any combination, and may include four kinds thereof in any combination. In a case where two or more kinds of atoms are included as the M atoms, a content of the M atom below is obtained as a total content of the M atoms included.

The hexagonal strontium ferrite powder includes 1.0 to 15.0 atom % of the one or more kinds of atom selected from the group consisting of a gallium atom, a scandium atom, an indium atom, and an antimony atom (M atoms) with respect to 100.0 atom % of the iron atom. The inventors have thought that the content of the M atoms described above may be a reason why the hexagonal strontium ferrite powder having the average particle size in the range described above and the coercivity Hc in the range described above can be used for manufacturing a magnetic recording medium having excellent electromagnetic conversion characteristics. Specifically, the inventors have surmised that the content of the M atoms in the range described above contributes to a decrease in switching field distribution (SFD) (hereinafter, referred to as "realization of low SFD"). However, this is merely a surmise and the invention is not limited thereto. The content of the M atoms in the hexagonal strontium ferrite powder is 1.0 atom %, preferably equal to or greater than 1.5 atom %, more preferably equal to or greater than 2.0 atom %, even more preferably equal to or greater than 2.5 atom %, and still preferably equal to or greater than 3.0 atom %, with respect to 100.0 atom % of the iron atom, from a viewpoint of improving electromagnetic conversion characteristics.

Meanwhile, it is considered that the hexagonal strontium ferrite powder is advantageous for increasing a reproducing output, in a case of reproducing information recorded on a magnetic recording medium, compared to other kinds of hexagonal ferrite powders. The reason therefor is because the mass magnetization σs tends to be higher, than that of other kinds of hexagonal ferrite powder. The content of the M atom in the hexagonal strontium ferrite powder is equal to or smaller than 15.0 atom % with respect to 100.0 atom % of the iron atom, from a viewpoint of improving electromagnetic conversion characteristics, and is preferably equal to or smaller than 14.0 atom %, more preferably equal to or smaller than 13.0 atom %, even more preferably equal to or smaller than 12.0 atom %, still preferably equal to or smaller than 11.0 atom %, and still more preferably equal to or smaller than 10.0 atom %, from a viewpoint of preventing a decrease in the mass magnetization σs.

The hexagonal strontium ferrite powder includes the iron atom, the strontium atom, the oxygen atom, and the M atom, and a content of the atoms other than these atoms can be, for example, equal to or smaller than 10.0 atom %, can be 0 to 5.0 atom %, and may be 0 atom %, with respect to 100.0 atom % of the iron atom. That is, in one aspect, the hexagonal strontium ferrite powder may not include atoms other than the iron atom, the strontium atom, the oxygen atom, and the M atom. In an embodiment, the hexagonal strontium ferrite powder may include atoms other than the iron atom, the strontium atom, the oxygen atom, and the M atom. As described above examples of such atoms include a barium atom and a calcium atom.

The content shown with atom % described above is obtained by converting a value of the content (unit: % by mass) of each atom obtained by totally dissolving the hexagonal strontium ferrite powder into a value shown with atom % by using the atomic weight of each atom. In addition, in the invention and the specification, a given atom which is "not included" means that the content thereof obtained by performing total dissolving and measurement by using an inductively coupled plasma (ICP) analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device.

The total dissolving means dissolving performed until the powder remaining in the solution is not visually confirmed at the time of the completion of the dissolving.

A vessel (for example, beaker) containing 12 mg of sample powder and 10 ml of hydrochloric acid having a concentration of 4 mol/L is held on a hot plate at a set temperature of 80° C. for 3 hours. The obtained solution is filtered with a membrane filter having a hole diameter of 0.1 μm. The element analysis of the solution obtained as described above is performed by an ICP analysis device. By doing so, the content of various atoms with respect to 100.0 atom % of the iron atom can be obtained. However, dissolving conditions of the total dissolving are merely examples, and dissolving conditions capable of performing the total dissolving can be randomly used.

The hexagonal strontium ferrite powder includes an iron atom, a strontium atom, an oxygen atom, and one or more kinds of atom selected from the group consisting of a gallium atom (Ga), a scandium atom (Sc), an indium atom (In), and an antimony atom (Sb), can randomly include a barium atom and/or a calcium atom, and can further randomly include one or more kinds of the other atoms. Examples of the atoms which may be further randomly included include an aluminum atom (Al), a neodymium atom (Nd), a samarium atom (Sm), a yttrium atom (Y), and a dysprosium atom (Dy). For example, in a case where the hexagonal strontium ferrite powder includes an aluminum atom, a content of the aluminum atom can be 1.0 to 20.0 atom % and is preferably 2.0 to 15.0 atom % with respect to 100.0 atom % of the iron atom. For example, in a case where the hexagonal strontium ferrite powder is a neodymium atom, a content of the neodymium atom can be 1.0 to 15.0 atom % and is preferably 3.0 to 12.0 atom % with respect to 100.0 atom % of the iron atom. In a case where the content of the aluminum atom or the neodymium atom is increased, the coercivity Hc tends to increase.

Mass Magnetization σs

From a viewpoint of increasing reproducing output in a case of reproducing information recorded on a magnetic recording medium, it is desirable that the mass magnetization σs of ferromagnetic powder included in the magnetic recording medium is high. In an embodiment, the mass magnetization σs of the hexagonal strontium ferrite powder can be equal to or greater than 41 $A \cdot m^2/kg$, is preferably equal to or greater than 42 $A \cdot m^2/kg$, more preferably equal to or greater than 43 $A \cdot m^2/kg$, even more preferably equal to or greater than 44 $A \cdot m^2/kg$, still preferably equal to or greater than 45 $A \cdot m^2/kg$, still more preferably equal to or greater than 46 $A \cdot m^2/kg$, still even more preferably equal to or greater than 47 $A \cdot m^2/kg$, and still further more preferably equal to or greater than 48 $A \cdot m^2/kg$. On the other hand, from a viewpoint of noise reduction, σs is preferably equal to or smaller than 80 $A \cdot m^2/kg$ and more preferably equal to or smaller than 60 $A \cdot m^2/kg$. σs can be measured by using a well-known measurement device capable of measuring magnetic properties such as an oscillation sample type magnetic-flux meter.

Manufacturing Method

The hexagonal strontium ferrite powder can be manufactured by a well-known manufacturing method as a manufacturing method of hexagonal ferrite, for example, a glass crystallization method, a coprecipitation method, a reverse micelle method, or a hydrothermal synthesis method. Hereinafter, a manufacturing method using a glass crystallization method will be described as a specific aspect. However, the hexagonal strontium ferrite powder can be manufactured by a method other than the glass crystallization method. As an example, for example, the hexagonal strontium ferrite powder can also be manufactured by a hydrothermal synthesis method. The hydrothermal synthesis method is a method of heating an aqueous solution including a hexagonal strontium ferrite precursor to convert the hexagonal strontium ferrite precursor into hexagonal strontium ferrite. Particularly, from a viewpoint of ease of manufacturing of the atomized hexagonal strontium ferrite powder having a small particle size, a continuous hydrothermal synthesis method of heating and pressurizing an aqueous solution including a hexagonal strontium ferrite precursor while sending the aqueous solution to a reaction flow path to convert the hexagonal strontium ferrite precursor into hexagonal strontium ferrite by using high reactivity of the heated and pressurized water, preferably water in a subcritical to supercritical state is preferable.

Manufacturing Method Using Glass Crystallization Method

The glass crystallization method generally includes the following steps.

(1) Step of melting a raw material mixture at least including a hexagonal strontium ferrite formation component and a glass formation component to obtain a molten material (melting step);

(2) Step of rapidly cooling the molten material to obtain an amorphous material (non-crystallization step);

(3) Step of heating the amorphous material and obtaining a crystalline material including hexagonal strontium ferrite particles and crystallized glass component precipitated by the heating (crystallization step); and (4) Step of collecting the hexagonal strontium ferrite particles from the crystalline material (particle collecting step).

Hereinafter, the step will be described later more specifically.

Melting Step

The raw material mixture used in the glass crystallization method for obtaining the hexagonal strontium ferrite powder includes the hexagonal strontium ferrite formation component and the glass formation component. The glass formation component here is a component which may show a glass transition phenomenon and may be subjected to non-crystallization (vitrification), and in a general glass crystallization method, a $B_2O_3$ component is used. Even in a case of using the glass crystallization method for obtaining the hexagonal strontium ferrite powder, a $B_2O_3$ component as the glass formation component, can be used. Each component included in the raw material mixture in the glass crystallization method is present as oxide or as various salt which may change into oxide during the step such as melting. The "$B_2O_3$ component" in the invention and the specification include $B_2O_3$ as it is, and various salts such as $H_3BO_3$ which may change to $B_2O_3$ during the step. The same applies to other components.

As the hexagonal strontium ferrite formation component included in the raw material mixture, oxide including an atom which is a constituting atom of the crystal structure of hexagonal strontium ferrite can be used. As specific examples, a $Fe_2O_3$ component, and a SrO component, and the like are used. In addition, in order to obtain hexagonal strontium ferrite powder including a barium atom, a BaO component can be used, and in order to obtain hexagonal strontium ferrite powder including calcium atom, a CaO component can be used.

In order to obtain hexagonal strontium ferrite powder including an M atom, an oxide component of the M atom (for example, $Ga_2O_3$, $Sc_2O_3$, $In_2O_3$, or $Sb_2O_3$) is used. In addition, for example, in order to obtain hexagonal strontium ferrite powder including an aluminum atom, an $Al_2O_3$ component is used, and in order to obtain hexagonal strontium ferrite powder including a neodymium atom, a $Nd_2O_3$ component is used.

A content of each component in the raw material mixture is not particularly limited, and may be determined according to the composition of the hexagonal strontium ferrite powder to be obtained. The raw material mixture can be prepared by weighing and mixing various components. Then, the raw material mixture is melted and a molten material is obtained. A melting temperature may be set according to the composition of the raw material mixture, and is generally 1,000° C. to 1,500° C. A melting time may be suitably set so that the raw material mixture is sufficiently melted.

Non-Crystallization Step

Next, the obtained molten material is rapidly cooled to obtain an amorphous material. The rapid cooling can be performed in the same manner as in a rapid cooling generally performed for obtaining an amorphous material in the glass crystallization method, and the rapid cooling step can be performed, for example, by a well-known method such as a method of pouring the molten material on a rapidly rotated water-cooled twin roller and performing rolling and rapid cooling.

Crystallization Step

After the rapid cooling, the obtained amorphous material is heated. By the heating, the hexagonal strontium ferrite particles and crystallized glass component can be precipitated. A particle size of the precipitated hexagonal strontium ferrite particles can be controlled depending on heating conditions. In a case where a heating temperature (crystallization temperature) for crystallization increases, a particle size of the hexagonal strontium ferrite particles to be precipitated tends to increase. In addition, a crystallization temperature increases, the coercivity Hc of the hexagonal strontium ferrite powder to be precipitated tends to increase. By considering the above point, it is preferable to control the heating conditions, so as to obtain the hexagonal strontium ferrite powder having average particle size and the coercivity Hc in the ranges described above. In an embodiment, the crystallization temperature is preferably 600° C. to 700° C. In addition, In an embodiment, the heating time for crystallization (holding time at the crystallization temperature) is, for example, 0.1 to 24 hours and preferably 0.15 to 8 hours. Further, In an embodiment, a rate of temperature increase until the temperature achieves the crystallization temperature is preferably 1.0 to 10.0° C./min, more preferably 1.5 to 7.0° C./min, and even more preferably 2.0 to 5.0° C./min.

Particle Collecting Step

The crystalline material obtained by heating the amorphous material includes the hexagonal strontium ferrite particles and the crystallized glass component. Therefore, in a case of performing acid treatment with respect to the crystalline material, the crystallized glass component surrounding the hexagonal strontium ferrite particles is dissolved and removed, thereby collecting the hexagonal strontium ferrite particles. Before the acid treatment, it is preferable to perform coarse crushing for increasing efficiency of the acid treatment. The coarse crushing may be performed by a dry or wet method. The coarse crushing conditions can be set according to a well-known method. The acid treatment for collecting particles can be performed by a method generally performed in the glass crystallization method such as acid treatment after heating. After that, by performing post-treatment such as water washing or drying, if necessary, the hexagonal strontium ferrite particles can be obtained.

Hereinabove, the manufacturing method of the hexagonal strontium ferrite powder according to one aspect of the invention has been described. However, the hexagonal strontium ferrite powder according to one aspect of the invention is not limited to hexagonal strontium ferrite powder manufactured by the specific aspect.

Magnetic Recording Medium

One aspect of the invention relates to a magnetic recording medium including a non-magnetic support; and a magnetic layer including a ferromagnetic powder and a binding agent on the non-magnetic support, in which the ferromagnetic powder is the hexagonal strontium ferrite powder.

Hereinafter, the magnetic recording medium will be described more specifically.

Magnetic Layer

Ferromagnetic Powder

The details of the ferromagnetic powder included in the magnetic layer of the magnetic recording medium are as described above. The content (filling percentage) of the ferromagnetic powder in the magnetic layer is preferably 50% to 90% by mass and more preferably 60% to 90% by mass. The components other than the ferromagnetic powder in the magnetic layer are at least a binding agent and one or more kinds of additives may be randomly included. A high filling percentage of the ferromagnetic powder in the magnetic layer is preferable from a viewpoint of improvement recording density.

Binding Agent and Curing Agent

The magnetic layer includes a binding agent together with the ferromagnetic powder. As the binding agent, one or more kinds of resin is used. The resin may be a homopolymer or a copolymer. As the binding agent included in the magnetic layer, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in a non-magnetic layer and/or a back coating layer which will be described later. The binding agent described above, description disclosed in paragraphs 0029 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation. 7.8 mmID (inner diameter)×30.0 cm)

Eluent: Tetrahydrofuran (THF)

In addition, a curing agent can also be used together with a resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. In a case where a composition used for forming the other layer includes the curing agent, this point also identically applies to the layer formed using this composition. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent in the magnetic layer forming composition can be, for example. 0 to 80.0 parts by mass, and is preferably 50.0 to 80.0 parts by mass with respect to 100.0 parts by mass of the binding agent.

Additives

The magnetic layer includes ferromagnetic powder and the binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. For example, for the lubricant, a description disclosed in paragraphs 0030 to 0033, 0035, and 0036 of JP2016-126817A can be referred to. The lubricant may be included in a non-magnetic layer which will be described later. For the lubricant which can be included in the non-magnetic layer, a description disclosed in paragraphs 0030, 0031, and 0034 to 0036 of JP2016-126817A can be referred to. For the dispersing agent, a description disclosed in paragraphs 0061 and 0071 of JP2012-133837A can be referred to. The dispersing agent may be included in the non-magnetic layer forming composition. For the dispersing agent which can be included in the non-magnetic layer forming composition, a description disclosed in paragraph 0061 of JP2012-133837A can be referred to. In addition, as the non-magnetic powder which may be included in the magnetic layer, non-magnetic powder which can function as an abrasive, non-magnetic powder (for example, non-magnetic colloid particles) which can function as a projection formation agent which forms projections suitably protruded from the surface of the magnetic layer, and the like can be used. As the additives, a commercially available product can be suitably selected according to the desired properties or manufactured by a well-known method, and can be used with any amount.

Non-Magnetic layer

Next, the non-magnetic layer will be described. The magnetic recording medium may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of an inorganic substance (inorganic powder) or powder of an organic substance (organic powder). In addition, carbon black and the like can be used. Examples of the inorganic substance include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic recording medium also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heat treatment may be performed with respect to these supports in advance.

Back Coating Layer

The magnetic recording medium can also include a back coating layer including non-magnetic powder and a binding agent on a surface side of the non-magnetic support opposite to the surface side provided with the magnetic layer. The back coating layer preferably includes one or both of carbon black and inorganic powder. In regards to the binding agent included in the back coating layer and various additives which can be randomly included in the back coating layer, a well-known technology regarding the back coating layer can be applied, and a well-known technology regarding the treatment of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774 can be referred to.

Thicknesses of Non-Magnetic Support and Each Layer

Regarding thicknesses of the non-magnetic support and each layer, a thickness of the non-magnetic support is, for example, 3.0 to 80.0 µm, preferably 3.0 to 20.0 µm and more preferably 3.0 to 10.0 µm.

A thickness of the magnetic layer can be optimized according to a saturation magnetization amount of a magnetic head used, a head gap length, a recording signal band, and the like. The thickness of the magnetic layer is generally 10 to 150 nm, preferably 20 to 120 nm and more preferably 30 to 100 nm, from a viewpoint of realization of high-density recording. The magnetic layer may be at least one layer, or the magnetic layer can be separated to two or more layers having magnetic properties, and a configuration regarding a well-known multilayered magnetic layer can be applied. In a case of the multilayered magnetic layer, the thickness of the magnetic layer is a total thickness of the plurality of magnetic layers.

A thickness of the non-magnetic layer is, for example, 0.05 to 3.0 µm, preferably 0.05 to 2.0 µm, and even more preferably 0.05 to 1.5 µm.

The thickness of the back coating layer is preferably equal to or smaller than 0.9 µm and more preferably 0.1 to 0.7 µm.

The thicknesses of each layer and the non-magnetic support of the magnetic recording medium can be acquired by a well-known film thickness measurement method. As an example, a cross section of the magnetic recording medium in a thickness direction is, for example, exposed by a well-known method of ion beams or microtome, and the exposed cross section is observed with a scanning electron microscope. In the cross section observation, various thicknesses can be acquired as a thickness acquired at one portion of the cross section, or an arithmetical mean of thicknesses acquired at a plurality of portions of two or more portions, for example, two portions which are randomly extracted. In addition, the thickness of each layer may be determined as a designed thickness calculated according to the manufacturing conditions.

Manufacturing Method of Magnetic Recording Medium

A step of manufacturing a composition for forming the magnetic layer, the non-magnetic layer, or the back coating layer generally includes at least a kneading step, a dispersing step, and a mixing step which is provided before or after these steps, if necessary. Each step may be divided into two or more stages. Various components may be added at an initial stage or in a middle stage of each step.

In addition, each component may be separately added in two or more steps.

In order to manufacture the magnetic recording medium, a well-known manufacturing technology of the related art can be used in a part of the step or in the entire step.

For example, in the kneading step, an open kneader, a continuous kneader, a pressure kneader, or a kneader having a strong kneading force such as an extruder is preferably used.

For the details of these kneading processes, descriptions disclosed in JP1989-106338A (JP-H01-106338A) and JP1989-079274A (JP-H01-079274A) can be referred to.

In order to disperse the composition for forming each layer, glass beads can be used as dispersion beads. As the dispersion beads, zirconia beads, titania beads, and steel beads which are dispersion beads having high specific gravity are suitable. These dispersion beads are preferably used by optimizing a particle diameter (bead diameter) and a filling percentage of these dispersion beads. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 µm (for example, a glass fiber filter or a polypropylene filter) can be used, for example.

The magnetic layer can be formed by directly applying the magnetic layer forming composition onto the non-magnetic support or performing multilayer coating with the non-magnetic layer forming composition in order or at the same time. In the aspect of performing the alignment process, while the coating layer of the magnetic layer forming composition is wet, an alignment process is performed on the coating layer in an alignment zone. For the alignment process, various well-known technologies disclosed in a paragraph 0052 of JP2010-024113A can be referred to. For example, a homeotropic alignment process can be performed by a well-known method such as a method using a polar opposing magnet. In the alignment zone, a drying speed of the coating layer can be controlled by a temperature of dry air, an air flow and/or a transportation speed in the alignment zone. In addition, the coating layer may be preliminarily dried before transporting in the alignment zone. The back coating layer can be formed by applying the back coating layer forming composition to the side of the non-magnetic support opposite to a side provided with the magnetic layer (or to be provided with the magnetic layer). For the details of the manufacturing method of the magnetic recording medium, description disclosed in paragraphs 0051 to 0057 of JP2010-024113A can also be referred to.

The magnetic recording medium according to one aspect of the invention described above can be a tape-shaped magnetic recording medium (magnetic tape) in one aspect, and can be a disk-shaped magnetic recording medium (magnetic disk) in another aspect. For example, the magnetic tape is normally used to be accommodated and circulated in a magnetic tape cartridge. A servo pattern can also be formed in the magnetic tape by a well-known method, in order to allow head tracking servo to be performed in the magnetic recording and reproducing apparatus. For example, the formation of the servo pattern can be performed on direct current (DC)-demagnetized magnetic layer. A direction of the demagnetization can be a longitudinal direction or a vertical direction of the magnetic tape. A direction of the magnetization, in a case of forming the servo pattern (that is, magnetization region) can be a longitudinal direction or a vertical direction of the magnetic tape. The magnetic recording medium includes the hexagonal strontium ferrite powder according to one aspect of the invention in the magnetic layer, and thus, it is possible to exhibit excellent electromagnetic conversion characteristics. The magnetic recording medium can be suitably used in a contact sliding type magnetic recording and reproducing system in which a surface of the magnetic layer and a magnetic head come into contact with each other and slide thereon, in a case of performing recording and/or reproducing of information.

Magnetic Recording and Reproducing Apparatus

One aspect of the invention relates to a magnetic recording and reproducing apparatus including the magnetic recording medium, and a magnetic head.

In the invention and the specification, the "magnetic recording and reproducing apparatus" means a device capable of performing at least one of the recording of information on the magnetic recording medium or the reproducing of information recorded on the magnetic recording medium. Such a device is generally called a drive. The magnetic recording and reproducing apparatus can be a sliding type magnetic recording and reproducing apparatus. The magnetic head included in the magnetic recording and reproducing apparatus can be a recording head capable of performing the recording of information on the magnetic recording medium, or can be a reproducing head capable of performing the reproducing of information recorded on the magnetic recording medium. In addition, In an embodiment, the magnetic recording and reproducing apparatus can include both of a recording head and a reproducing head as separate magnetic heads. In another aspect, the magnetic head included in the magnetic recording and reproducing apparatus can also have a configuration of including both of a recording element and a reproducing element in one magnetic head. As the reproducing head, a magnetic head (MR head) including a magnetoresistive (MR) type element as a reproducing element which can read the information recorded on the magnetic recording medium with high sensitivity is preferable. As the MR head, various well-known MR heads such as an AnisotropicMagnetoresistive (AMR) head, a Giant Magnetoresistive (GMR) head, and a Tunnel Magnetoresistive (TMR) can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) including a servo pattern reading element may be included in the magnetic recording and reproducing apparatus.

In the magnetic recording and reproducing apparatus, the recording of information on the magnetic recording medium and/or the reproducing of information recorded on the magnetic recording medium can be performed by bringing the surface of the magnetic layer of the magnetic recording medium into contact with the magnetic head and sliding, for example. The magnetic recording and reproducing apparatus may include such a magnetic recording medium according to one aspect of the invention, and well-known technologies can be applied for the other configurations.

EXAMPLES

Hereinafter, the invention will be described with reference to examples more specifically. However, the invention is not limited to aspects shown in the examples. "Parts" and "%" in the following description indicate "parts by mass" and "% by mass", unless otherwise noted. "eq" is an equivalent which is a unit which cannot be converted into the SI unit. In addition, steps and evaluations described below are performed in an atmosphere at 23° C.±1° C., unless otherwise noted.

1. Preparation and Evaluation of Hexagonal Strontium Ferrite Powder (1) Preparation and Hexagonal Strontium Ferrite Powder Example 1

1.070 g of $SrCO_3$, 450 g of $H_3BO_3$, 675 g of $Fe_2O_3$, 64 g of $Ga_2O_3$, 29 g of $Al(OH)_3$, 42 g of $BaCO_3$, and 21 g of $CaCO_3$ were weighed and mixed with a mixer to obtain a raw material mixture.

The obtained raw material mixture was melted in a platinum crucible at a melting temperature of 1,390° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

280 g of the manufactured amorphous material was put into an electric furnace and heated to a temperature shown in Table 1 (crystallization temperature) at a rate of temperature increase of 3.5° C./min, and held at the same temperature for 5 hours, to precipitate (crystallize) hexagonal strontium ferrite particles.

Then, a crystalline material obtained above including the hexagonal strontium ferrite particles was coarsely crushed with a mortar. A dispersion process was performed with a paint shaker for 3 hours, by adding 1,000 g of zirconia beads having a particle diameter of 1 mm and 800 ml of acetic acid having a concentration of 1% in a glass bottle including the obtained coarsely crushed material. After that, the obtained dispersion liquid was separated from the beads and put into a stainless steel beaker. A dissolving process of the glass component was performed by leaving the dispersion liquid at a liquid temperature of 100° C. for 3 hours, the precipitation was performed with a centrifugal separator, decantation was repeated for washing, and the resultant material was dried in a heating furnace at a temperature in the furnace of 110° C. for 6 hours, thereby obtaining hexagonal strontium ferrite powder.

Comparative Example 1

Hexagonal strontium ferrite powder was obtained in the same manner as in Example 1, except that the amount $Ga_2O_3$ used in the preparation of the raw material mixture was set as 6.7 g.

Example 2

Hexagonal strontium ferrite powder was obtained in the same manner as in Example 1, except that the amount $Ga_2O_3$ used in the preparation of the raw material mixture was set as 11 g.

Example 3

Hexagonal strontium ferrite powder was obtained in the same manner as in Example 1, except that the amount $Ga_2O_3$ used in the preparation of the raw material mixture was set as 79 g.

Example 4

Hexagonal strontium ferrite powder was obtained in the same manner as in Example 1, except that the amount $Ga_2O_3$ used in the preparation of the raw material mixture was set as 110 g.

Comparative Example 2

Hexagonal strontium ferrite powder was obtained in the same manner as in Example 1, except that the amount $Ga_2O_3$ used in the preparation of the raw material mixture was set as 116 g.

Comparative Example 3

Hexagonal strontium ferrite powder was obtained in the same manner as in Example 1, except that the crystallization temperature was changed to a temperature shown in Table 1.

Example 5

Hexagonal strontium ferrite powder was obtained in the same manner as in Example 1, except that the crystallization temperature was changed to a temperature shown in Table 1.

Example 6

Hexagonal strontium ferrite powder was obtained in the same manner as in Example 1, except that the crystallization temperature was changed to a temperatures shown in Table 1.

Example 7

Hexagonal strontium ferrite powder was obtained in the same manner as in Example 1, except that the crystallization temperature was changed to a temperatures shown in Table 1.

Example 8

Hexagonal strontium ferrite powder was obtained in the same manner as in Example 1, except that the crystallization temperature was changed to a temperatures shown in Table 1.

Comparative Example 4

Hexagonal strontium ferrite powder was obtained in the same manner as in Example 1, except that the crystallization temperature was changed to a temperatures shown in Table 1.

Comparative Example 5

Hexagonal strontium ferrite powder was obtained in the same manner as in Example 1, except that 1.044 g of $SrCO_3$, 469 g of $H_3BO_3$, 675 g of $Fe_2O_3$, 66 g of $Ga_2O_3$, and 140 g of $BaCO_3$ were weighed in the preparation of the raw material mixture, the raw material mixture was obtained by mixing the components with each other, and the crystallization temperature was changed to a temperature shown in Table 1.

Example 9

Hexagonal strontium ferrite powder was obtained in the same manner as in Example 1, except that 1,048 g of $SrCO_3$, 469 g of $H_3BO_3$, 675 g of $Fe_2O_3$, 66 g of $Ga_2O_3$, and 133 g of $BaCO_3$ were weighed in the preparation of the raw material mixture, and the raw material mixture was obtained by mixing tire components with each other.

Example 10

Hexagonal strontium ferrite powder was obtained in the same manner as in Example 3, except that 1,055 g of $SrCO_3$, 424 g of $H_3BO_3$, 678 g of $Fe_2O_3$, 64 g of $Ga_2O_3$, 72 g of $Al(OH)_3$, 42 g of $BaCO_3$, and 21 g of $CaCO_3$ were weighed in the preparation of the raw material mixture, the raw material mixture was obtained by mixing the components with each other, and the crystallization temperature was changed to a temperature shown in Table 1.

Comparative Example 6

Hexagonal strontium ferrite powder was obtained in the same manner as in Example 1, except that 1,020 g of $SrCO_3$, 375 g of $H_3BO_3$, 678 g of $Fe_2O_3$, 64 g of $Ga_2O_3$, 151 g of $Al(OH)_3$, 42 g of $BaCO_3$, and 22 g of $CaCO_3$ were weighed in the preparation of the raw material mixture, the raw material mixture was obtained by mixing the components with each other, and the crystallization temperature was changed to a temperature shown in Table 1.

Example 11

Hexagonal strontium ferrite powder was obtained in the same manner as in Example 1, except that 1,054 g of $SrCO_3$, 424 g of $H_3BO_3$, 677 g of $Fe_2O_3$, 64 g of $Ga_2O_3$, 71 g of $Al(OH)_3$, 42 g of $BaCO_3$, 21 g of $CaCO_3$, and 143 g of $Nd_2O_3$ were weighed in the preparation of the raw material mixture, the raw material mixture was obtained by mixing the components with each other, and the crystallization temperature was changed to a temperature shown in Table 1.

Example 12

Hexagonal strontium ferrite powder was obtained in the same manner as in Example 1, except that the crystallization temperature was changed to a temperature shown in Table 1.

Example 13

Hexagonal strontium ferrite powder was obtained in the same manner as in Example 1, except that 1,073 g of $SrCO_3$, 450 g of $H_3BO_3$, 677 g of $Fe_2O_3$, 47 g of $Sc_2O_3$, 29 g of $Al(OH)_3$, 42 g of $BaCO_3$, and 21 g of $CaCO_3$ were weighed in the preparation of the raw material mixture, and the raw material mixture was obtained by mixing the components with each other.

Example 14

Hexagonal strontium ferrite powder was obtained in the same manner as in Example 13, except that the amount of $Sc_2O_3$ used in the preparation of the raw material mixture was set as 7 g.

Example 15

Hexagonal strontium ferrite powder was obtained in the same manner as in Example 13, except that the amount of $Sc_2O_3$ used in the preparation of the raw material mixture was set as 81 g.

Example 16

Hexagonal strontium ferrite powder was obtained in the same manner as in Example 1, except that 1,073 g of $SrCO_3$, 450 g of $H_3BO_3$, 677 g of $Fe_2O_3$, 95 g of $In_2O_3$, 29 g of $Al(OH)_3$, 42 g of $BaCO_3$, and 21 g of $CaCO_3$ were weighed in the preparation of the raw material mixture, and the raw material mixture was obtained by mixing the components with each other.

Example 17

Hexagonal strontium ferrite powder was obtained in the same manner as in Example 16, except that the amount of $In_2O_3$ used in the preparation of the raw material mixture was set as 15 g.

Example 18

Hexagonal strontium ferrite powder was obtained in the same manner as in Example 16, except that the amount of $In_2O_3$ used in the preparation of the raw material mixture was set as 162 g.

Example 19

Hexagonal strontium ferrite powder was obtained in the same manner as in Example 1, except that 1,073 g of $SrCO_3$, 450 g of $H_3BO_3$, 677 g of $Fe_2O_3$, 99 g of $Sb_2O_3$, 29 g of $Al(OH)_3$, 42 g of $BaCO_3$, and 21 g of $CaCO_3$ were weighed in the preparation of the raw material mixture, and the raw material mixture was obtained by mixing the components with each other.

Example 20

Hexagonal strontium ferrite powder was obtained in the same manner as in Example 19, except that the amount of $Sb_2O_3$ used in the preparation of the raw material mixture was set as 15 g.

Example 21

Hexagonal strontium ferrite powder was obtained in the same manner as in Example 19, except that the amount of $Sb_2O_3$ used in the preparation of the raw material mixture was set as 172 g.

Example 22

Hexagonal strontium ferrite powder was obtained in the same manner as in Example 1, except that 1,136 g of $SrCO_3$, 451 g of $H_3BO_3$, 677 g of $Fe_2O_3$, 64 g of $Ga_2O_3$, and 29 g of $Al(OH)_3$ were weighed in the preparation of the raw material mixture, the raw material mixture was obtained by mixing the components with each other, and the crystallization temperature was changed to a temperature shown in Table 1.

Example 23

Hexagonal strontium ferrite powder was obtained in the same manner as in Example 1, except that 1,085 g of $SrCO_3$, 470 g of $H_3BO_3$, 677 g of $Fe_2O_3$, 64 g of $Ga_2O_3$, 42 g of $BaCO_3$, and 21 g of $CaCO_3$ were weighed in the preparation of the raw material mixture, the raw material mixture was obtained by mixing the components with each other, and the crystallization temperature was changed to a temperature shown in Table 1.

(2) Evaluation of Hexagonal Strontium Ferrite Powder (X-Ray Diffraction Analysis)

Sample powder was collected from the powder obtained in the examples and the comparative examples, and the X-ray diffraction analysis was performed. As a result of analysis, all of the powder obtained in the examples and the comparative examples showed a crystal structure of magnetoplumbite type (M type) hexagonal ferrite. In addition, a crystal phase detected by the X-ray diffraction analysis was a magnetoplumbite type single phase. The X-ray diffraction analysis was performed by scanning with a CuKα ray at a voltage of 45 kV and intensity of 40 mA and by measuring X-ray diffraction pattern under the conditions.

PANalytical X'Pert Pro diffractometer, PIXcel detector
Soller slit of incident beam and diffraction beam: 0.017 radians
Fixed angle of dispersion slit: ¼ degrees
Mask; 10 mm
Scattering prevention slit: ¼ degrees
Measurement mode: continuous
Measurement time per 1 stage: 3 seconds
Measurement speed: 0.017 degrees per second
Measurement step: 0.05 degrees Contents of Various Atoms 12 mg of sample powder was collected from each hexagonal strontium ferrite powder of the examples and the comparative examples, element analysis of filtrate obtained by totally dissolving the sample powder under the dissolving conditions described above was performed by the ICP analysis device, and the contents of various atoms were obtained.

Average Particle Size

Sample powder was collected from each hexagonal strontium ferrite powder of the examples and the comparative examples, and an average particle size was obtained by the method described above.

Coercivity Hc and Mass Magnetization σs

The coercivity Hc and the mass magnetization σs of each hexagonal strontium ferrite powder of the examples and the comparative examples were measured by using an oscillation sample type magnetic-flux meter (manufactured by Toei Industry Co., Ltd.) at a magnetic field strength of 1,194 kA/m (15 kOe) at a measurement temperature of 25° C.±1° C.

2. Manufacturing and Evaluation of Magnetic Recording Medium (Magnetic Tape)

(1) Manufacturing of Magnetic Recording Medium (Magnetic Tape)

A magnetic tape was manufactured by the following method by using each hexagonal strontium ferrite powder of the examples and the comparative examples. Hereinafter, the magnetic tape manufactured by using the hexagonal strontium ferrite powder of Example 1 is referred to as a magnetic tape of Example 1. The same applies to the other examples and comparative examples.

List of Magnetic Layer Forming Composition

Hexagonal strontium ferrite powder of the examples and the comparative examples: 100.0 parts
  Polyurethane resin: 12.2 parts
  Weight-average molecular weight: 10,000
  Sulfonic acid group content: 0.5 meq/g
  Diamond particles: 1.85 parts
  Average particle size: 50 nm
  Carbon black (#55 manufactured by Asahi Carbon Co., Ltd.): 0.5 parts
  Average particle size: 0.015 μm
  Stearic acid: 0.5 parts
  Butyl stearate: 2.1 parts
  Methyl ethyl ketone: 180.0 parts
  Cyclohexanone: 100.0 parts List of Non-Magnetic Layer Forming Composition Non-magnetic powder α-iron oxide: 103.0 parts
  Average particle size: 0.09 μm
  BET (Brunauer-Emmett-Teller) specific surface area: 50 m$^2$/g
  pH: 7
  Dibutyl phthalate (DBP) oil absorption amount: 27 to 38 g/100 g
  Surface treating agent: $Al_2O_3$ (8% by mass)
  Carbon black (CONDUCTEX TEX SC-U manufactured by Columbia Carbon): 25.0 parts
  A vinyl chloride copolymer (MR 104 manufactured by Zeon Corporation): 12.9 parts
  A polyurethane resin (UR8200 manufactured by Toyobo Co., Ltd.): 5.2 parts
  Phenylphosphonic acid: 3.5 parts
  Butyl stearate: 1.1 parts
  Stearic acid: 2.1 parts
  Methyl ethyl ketone; 205.0 parts
  Cyclohexanone: 135.0 parts List of Back Coating Layer Forming Composition Non-magnetic powder α-iron oxide: 80.0 parts
  Average particle size: 0.15 μm
  Average acicular ratio: 7
  BET specific surface area: 52 m$^2$/g
  Carbon black: 20.0 parts
  Average particle size: 20 nm
  A vinyl chloride copolymer: 13.0 parts
  A sulfonic acid group-containing polyurethane resin: 6.0 parts
  Phenylphosphonic acid: 3.0 parts
  Cyclohexanone: 155.0 parts
  Methyl ethyl ketone: 155.0 parts
  Stearic acid: 3.0 parts
  Butyl stearate: 3.0 parts
  Polyisocyanate: 5.0 parts
  Cyclohexanone: 200.0 parts Manufacturing of Magnetic Tape Regarding each of the magnetic layer forming composition and the non-magnetic layer forming composition, various components were kneaded with a kneader. The component was transferred to a transverse sand mill containing zirconia beads having a particle diameter of 1.0 mm by the filling amount which is 65 volume % with respect to a volume of a dispersion portion, and dispersed at 2,000 revolution per minutes (rpm) for 120 minutes (time for which the component is substantially held in the dispersion portion). Regarding the magnetic layer forming composition, the obtained dispersion liquid was filtered by using a filter having a hole diameter of 1 μm, thereby obtaining the magnetic layer forming composition. Regarding the non-magnetic layer forming composition, 6.5 parts of polyisocyanate and 7.0 parts of methyl ethyl ketone were added to the dispersion liquid obtained by the dispersion and filtered by using a filter having a hole diameter of 1 μm, thereby obtaining the magnetic layer forming composition.

A back coating layer forming composition was prepared by the following method. The components excluding the lubricant (stearic acid and butyl stearate), polyisocyanate, and 200.0 parts of cyclohexanone were kneaded by an open kneader and diluted, and was subjected to a dispersion process of 12 passes, with a transverse beads mill dispersing machine and zirconia beads having a particle diameter of 1.0 mm, by setting a bead filling percentage as 80 volume %, a circumferential speed of rotor distal end as 10 m/sec, and a retention time for 1 pass as 2 minutes. After that, the remaining components were added to the dispersion liquid and stirred with a dissolver. The obtained dispersion liquid was filtered with a filter having an average hole diameter of 1 μm and the back coating layer forming composition was obtained.

After that, the non-magnetic layer forming composition was applied onto one surface of a non-magnetic support made of polyethylene naphthalate having a thickness of 5.0 μm so that a thickness after the drying becomes 0.1 μm and was dried, and then, the non-magnetic layer was formed.

Then, the magnetic layer forming composition was applied onto the non-magnetic layer so that a thickness after the drying becomes 70 nm, and a coating layer was formed. A homeotropic alignment process was performed by applying a magnetic field having a magnetic field strength of 0.6 T in a vertical direction with respect to a surface of the coating layer, while the coating layer is wet, and then, the coating surface was dried to form a magnetic layer.

After that, the back coating layer forming composition was applied to the opposite surface of the non-magnetic support so that a thickness after the drying becomes 0.4 μm and was dried, thereby forming the back coating layer.

Then, a surface smoothing treatment (calender process) was performed by a calender configured of only a metal roll, at a surface temperature of a calender roll of 90° C. and linear pressure of 300 kg/cm (294 kN/m). After that, slitting was performed to have a width of ½ inches (0.0127 meters), and surface polishing treatment was performed, thereby obtaining a magnetic tape.

(2) Evaluation of Magnetic Recording Medium (Magnetic Tape)

Evaluation of Electromagnetic Conversion Characteristics (Noise))

A magnetic signal was recorded on each magnetic tape of the examples and the comparative examples in a tape longitudinal direction under the following conditions and reproduced with a magnetoresistive (MR) head. A reproduction signal was frequency-analyzed with a spectrum analyzer manufactured by Shibasoku Co., Ltd. and the noise accumulated in the range of 0 to 600 kfci were evaluated. The unit, kfci, is a unit of linear recording density (not able to be converted into the SI unit system).

Recording and Reproduction Conditions

Recording: recording track width 5 μm
Recording gap 0.17 μm
Head saturated magnetic flux density Bs 1.8 T
Reproduction: Reproduction track width 0.4 μm
Distance between shields (sh-sh distance) 0.08 μm Evaluation Standard 5: Substantially no noise, a signal is excellent, and no error is observed.
4: A degree of noise is smaller than that observed in the level 3. A signal is excellent.
3: Noise is observed. A signal is excellent.
2: A degree of noise is greater than that observed in the level 3. A signal is unclear.
1: Noise and signal cannot be distinguished or cannot be recorded.

The results of the above evaluation are shown in Table 1 (Tables 1-1 and 1-2).

|  | Kind of M atom | Content of each constituent atom (with respect to 100.0 atom % of Fe atom) | | | | | |
|---|---|---|---|---|---|---|---|
|  |  | M atom (atom %) | Sr atom (atom %) | Ba atom (atom %) | Ca atom (atom %) | Al atom (atom %) | Nd atom (atom %) |
| Example 1 | Ga | 8.2 | 8.5 | 1.6 | 0.4 | 4.2 | 0 |
| Comparative Example 1 | Ga | 0.8 | 8.5 | 1.6 | 0.4 | 4.1 | 0 |
| Example 2 | Ga | 1.2 | 8.4 | 1.6 | 0.4 | 4.2 | 0 |
| Example 3 | Ga | 10.1 | 8.5 | 1.6 | 0.4 | 4.2 | 0 |
| Example 4 | Ga | 14.7 | 8.5 | 1.6 | 0.5 | 4.2 | 0 |
| Comparative Example 2 | Ga | 8.2 | 8.4 | 1.7 | 0.4 | 4.2 | 0 |
| Comparative Example 3 | Ga | 8.2 | 8.5 | 1.6 | 0.4 | 4.2 | 0 |
| Example 5 | Ga | 8.2 | 8.4 | 1.6 | 0.4 | 4.2 | 0 |
| Example 6 | Ga | 8.2 | 8.5 | 1.6 | 0.4 | 4.2 | 0 |
| Example 7 | Ga | 8.2 | 8.4 | 1.6 | 0.5 | 4.2 | 0 |
| Example 8 | Ga | 8.2 | 8.5 | 1.6 | 0.4 | 4.2 | 0 |
| Comparative Example 4 | Ga | 8.2 | 8.5 | 1.6 | 0.4 | 4.2 | 0 |
| Comparative Example 5 | Ga | 8.3 | 6.5 | 4.2 | 0 | 0 | 0 |
| Example 9 | Ga | 8.2 | 6.4 | 4.3 | 0 | 0 | 0 |
| Example 10 | Ga | 8.2 | 8.1 | 1.6 | 0.4 | 10.1 | 0 |
| Comparative Example 6 | Ga | 8.2 | 8.1 | 1.6 | 0.4 | 21.0 | 0 |
| Example 11 | Ga | 8.2 | 7.9 | 1.6 | 0.4 | 10.0 | 10.0 |
| Example 12 | Ga | 8.2 | 7.9 | 1.6 | 0.4 | 10.0 | 10.0 |

|  | Crystallization temperature (° C.) | Average particle size (nm) | Hc | | σs | Electromagnetic conversion characteristics |
|---|---|---|---|---|---|---|
|  |  |  | (Oe) | (KA/m) | A · m²/kg |  |
| Example 1 | 640 | 16.3 | 2398 | 191 | 50 | 5 |
| Comparative Example 1 | 640 | 16.2 | 2336 | 186 | 52 | 2 |
| Example 2 | 640 | 16.4 | 2412 | 192 | 51 | 4 |
| Example 3 | 640 | 16.3 | 2371 | 189 | 49 | 4 |
| Example 4 | 640 | 16.2 | 2366 | 188 | 46 | 4 |
| Comparative Example 2 | 640 | 16.2 | 2455 | 195 | 41 | 2 |
| Comparative Example 3 | 625 | 9.8 | 2012 | 160 | 48 | 2 |
| Example 5 | 627 | 10.4 | 2078 | 165 | 50 | 4 |
| Example 6 | 649 | 21.0 | 2398 | 191 | 48 | 5 |
| Example 7 | 643 | 17.4 | 2471 | 197 | 49 | 5 |
| Example 8 | 646 | 19.5 | 2679 | 213 | 49 | 4 |
| Comparative Example 4 | 660 | 25.3 | 2884 | 230 | 48 | 1 |

-continued

| | | | | | | |
|---|---|---|---|---|---|---|
| Comparative Example 5 | 658 | 15.1 | 1940 | 154 | 48 | 2 |
| Example 9 | 640 | 15.3 | 2070 | 165 | 50 | 4 |
| Example 10 | 670 | 15.7 | 3950 | 314 | 48 | 4 |
| Comparative Example 6 | 680 | 16.6 | 4064 | 323 | 43 | 2 |
| Example 11 | 655 | 11.1 | 2543 | 202 | 47 | 4 |
| Example 12 | 675 | 15.4 | 3887 | 309 | 42 | 4 |

| | | Content of each constituent atom (with respect to 100.0 atom % of Fe atom) | | | | |
|---|---|---|---|---|---|---|
| | Kind of M atom | M atom (atom %) | Sr atom (atom %) | Ba atom (atom %) | Ca atom (atom %) | Al atom (atom %) | Nd atom (atom %) |
| Example 13 | Sc | 8.1 | 8.4 | 1.6 | 0.4 | 4.2 | 0 |
| Example 14 | Sc | 1.1 | 8.4 | 1.6 | 0.4 | 4.2 | 0 |
| Example 15 | Sc | 14.3 | 8.4 | 1.7 | 0.4 | 4.2 | 0 |
| Example 16 | In | 8.3 | 8.4 | 1.6 | 0.4 | 4.2 | 0 |
| Example 17 | In | 1.2 | 8.5 | 1.6 | 0.4 | 4.2 | 0 |
| Example 18 | In | 14.6 | 8.4 | 1.6 | 0.4 | 4.2 | 0 |
| Example 19 | Sb | 8.4 | 8.4 | 1.6 | 0.4 | 4.2 | 0 |
| Example 20 | Sb | 1.1 | 8.4 | 1.6 | 0.4 | 4.2 | 0 |
| Example 21 | Sb | 14.8 | 8.4 | 1.6 | 0.4 | 4.2 | 0 |
| Example 22 | Ga | 8.2 | 9.1 | 0.0 | 0.0 | 4.2 | 0 |
| Example 23 | Ga | 8.2 | 8.5 | 1.6 | 0.4 | 0 | 0 |

| | Crystallization temperature (° C.) | Average particle size (nm) | Hc (Oe) | Hc (KA/m) | σs (A·m²/kg) | Electromagnetic conversion characteristics |
|---|---|---|---|---|---|---|
| Example 13 | 640 | 15.6 | 2415 | 192 | 48 | 3 |
| Example 14 | 640 | 15.7 | 2261 | 180 | 46 | 3 |
| Example 15 | 640 | 15.5 | 2443 | 194 | 42 | 3 |
| Example 16 | 640 | 16.0 | 2378 | 189 | 49 | 3 |
| Example 17 | 640 | 16.1 | 2283 | 182 | 51 | 3 |
| Example 18 | 640 | 16.1 | 2411 | 192 | 41 | 3 |
| Example 19 | 640 | 16.2 | 2359 | 188 | 48 | 3 |
| Example 20 | 640 | 15.9 | 2397 | 191 | 50 | 3 |
| Example 21 | 640 | 16.0 | 2299 | 183 | 42 | 3 |
| Example 22 | 637 | 16.5 | 2277 | 181 | 50 | 4 |
| Example 23 | 618 | 16.4 | 2144 | 171 | 52 | 4 |

From the results shown in Table 1, it can be confirmed that, in the magnetic tapes of the examples, the electromagnetic conversion characteristics were excellent compared to those in the magnetic tapes of the comparative examples.

One aspect of the invention is useful in the technical field of a magnetic recording medium for high-density recording.

What is claimed is:

1. A hexagonal strontium ferrite powder,
   wherein an average particle size is 10.0 to 25.0 nm,
   a content of one or more kinds of atom selected from the group consisting of a gallium atom, a scandium atom, an indium atom, and an antimony atom is 1.0 to 15.0 atom % with respect to 100.0 atom % of an iron atom, and
   a coercivity Hc is greater than 2,000 Oe and smaller than 4,000 Oe, and
   which is a ferromagnetic powder for magnetic recording.

2. The hexagonal strontium ferrite powder according to claim 1, wherein a mass magnetization σs is equal to or greater than 41 A·m²/kg.

3. The hexagonal strontium ferrite powder according to claim 1, comprising:
   a gallium atom.

4. The hexagonal strontium ferrite powder according to claim 1, comprising:
   a scandium atom.

5. The hexagonal strontium ferrite powder according to claim 1, comprising:
   an indium atom.

6. The hexagonal strontium ferrite powder according to claim 1, comprising:
   an antimony atom.

7. The hexagonal strontium ferrite powder according to claim 1, further comprising:
   an aluminum atom.

8. The hexagonal strontium ferrite powder according to claim 1, further comprising:
   a neodymium atom.

9. The hexagonal strontium ferrite powder according to claim 1,
   wherein the hexagonal strontium ferrite powder has a magnetoplumbite type crystal structure.

10. The hexagonal strontium ferrite powder according to claim 1,
    wherein the content of the one or more kinds of atom selected from the group consisting of a gallium atom, a scandium atom, an indium atom, and an antimony atom is 1.0 to 12.0 atom % with respect to 100.0 atom % of an iron atom.

11. The hexagonal strontium ferrite powder according to claim 10, comprising:
a gallium atom.

12. The hexagonal strontium ferrite powder according to claim 10, comprising:
a scandium atom.

13. The hexagonal strontium ferrite powder according to claim 10, comprising:
an indium atom.

14. The hexagonal strontium ferrite powder according to claim 10, comprising:
an antimony atom.

15. The hexagonal strontium ferrite powder according to claim 10, further comprising:
an aluminum atom.

16. The hexagonal strontium ferrite powder according to claim 10, further comprising:
a neodymium atom.

* * * * *